Feb. 7, 1950  C. W. DALZELL  2,496,859
BATTERY CHARGER

Filed May 8, 1946  2 Sheets-Sheet 1

Inventor,
CLARENCE W. DALZELL

Semmes Keegin Beale & Semmes
attys.
By

Feb. 7, 1950          C. W. DALZELL          2,496,859
BATTERY CHARGER

Filed May 8, 1946          2 Sheets-Sheet 2

Inventor,
CLARENCE W. DALZELL

By Semmes Keegin Beale & Semmes
Attys.

Patented Feb. 7, 1950

2,496,859

UNITED STATES PATENT OFFICE 2,496,859

BATTERY CHARGER

Clarence W. Dalzell, West Caldwell, N. J., assignor to Heyer Industries Incorporated, Belleville, N. J., a corporation of Delaware Application May 8, 1946, Serial No. 668,179

2 Claims. (Cl. 320—19)

This invention relates to battery chargers, and more particularly to a low rate charging unit for use in maintaining charged storage batteries in merchandising and similar establishments "fresh" or fully charged and ready for consumer use.

In the merchandising of storage batteries, a small number, usually 10 or 12, are kept on display by retail stores or battery depots on a display rack, charged and ready for consumer use. Battery sales turnover, however, varies considerably with different seasons of the year, usually being rapid at the beginning of cold weather and slow during the warm weather, or because of other conditions. Such variable turnover obviously presents the problem of maintaining the displayed batteries at full charge, both because of the length of the time they may be held during the slow periods and because of the varying number possible to have on display during the periods of rapid sales.

Low rate charging is well known but the provision of a low rate charger for a group of batteries which will maintain a predetermined low charging rate, regardless of the number of batteries in the group, presents various problems. For example, a charging method may be employed using a single rectifier and a series circuit made to the group of batteries. With such a method unusually high voltages are encountered, which for a 10 or 12 battery circuit, for instance, makes it difficult to operate a 2 ampere rectifier bulb within its rated value. Moreover, because it is a series circuit, should there be 10 or 12 batteries in the circuit, for example, the reverse peak to which the operator or consumer would be subjected would be about 250 volts, enough to sometimes endanger human life and, in all cases, to cause an uncomfortable shock.

Another charging method may be to employ a common central transformer and a separate rectifier and charging circuit for each battery, with a suitable switching means to turn on the central transformer intermittently for cyclic charging of the group. This method eliminates the disadvantages of a series charging mentioned above. Regulation of such a system is easily obtained, but is only obtained at the expense of high rectifier cost and consequent high cost of the charging unit.

It is, therefore, one of the principal objects of this invention to provide an inexpensive intermittent charger for charging a group of batteries, and which includes current supply means only large enough to provide charging current for a single battery.

Another object of the invention is to provide a battery charger of the above character which incorporates a novel cyclically operated switching means for connecting singly and independently the batteries in a group thereof periodically in the charging circuit for a predetermined percentage of the cycle, each battery sequentially receiving equal charge at the same rate.

Another object of the invention is to provide a charger of the above character which is adaptable for supplying charging current to one or more batteries within a predetermined number, and which may be adapted to a greater number of batteries with only an increase in the number of contact points in the switching means.

Still another object of the invention is to provide a charger incorporating the above features, and also provided with a lamp which indicates to the operator charging conditions such as the direction of the passage of current through a battery, provides shortcircuit protection, provides a ballast effect and stabilizes charging current against variations in primary voltage and battery charging voltage.

Yet another object of this invention is to provide a battery charging device of the foregoing character incorporating any type rectifier that will most effectively meet the requirements of the charger such as a thermionic tube, mechanical, copper sulphide, etc.

A further object of the invention is to provide an intermittent charger for maintaining a group of storage batteries fully charged, comprising a single transformer, a rectifier and a charging circuit including said transformer, said rectifier and a multiple contact or segment switch for successively connecting a group of batteries, one at a time, in the charging circuit, the switch being activated electrically or mechanically to complete a cycle in a substantially long period of time, and at a predetermined ratio of time on to time off.

A still further object of the invention is to provide an intermittent charger of the above character in combination with a metal display rack for the batteries, the metal rack constituting one of the conductors in the charging circuit.

With these and other important objects and advantages in view, the invention consists in the parts and combinations hereinafter set forth, with the understanding that various changes may be made in the construction and arrangement of the several parts by those skilled in the art, without departing from the spirit of the invention or exceeding the scope of the appended claims.

In order to make the invention more clearly understood, reference is made to the accompanying drawings which illustrate preferred structural and circuit arrangements and in which.

Figure 1:
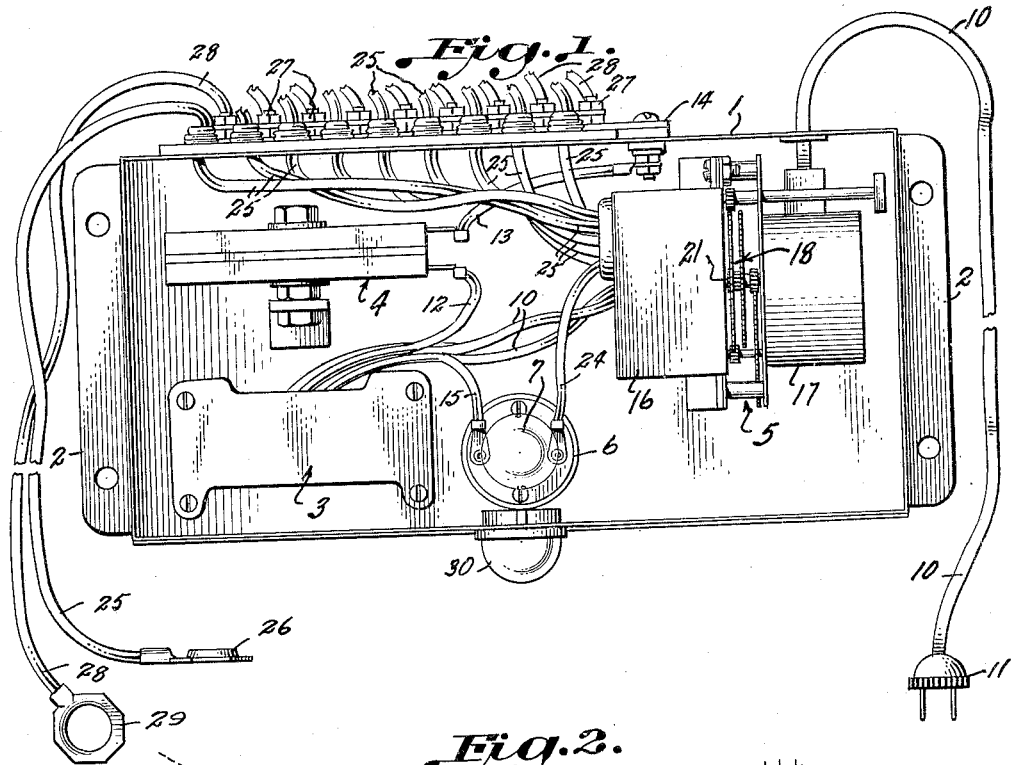
Figure 1 is a plan view of a charger constructed in accordance with this invention, the view being shown with the cover of the charger casing removed.

Referring now more particularly to the drawings, there is shown in Figure 1 a battery charging unit according to this invention comprising a metal case 1, substantially rectangular in shape and provided with mounting flanges 2. Within the case 1, is mounted the component units of the charger comprising a transformer 3, a rectifier 4, a motor driven rotary switch assembly designated generally as 5, and a lamp socket 6 which carries a lamp 7. The casing 1 is adapted to be fitted with a cover (not shown).

The transformer 3 is of usual iron core construction having a primary winding 8 and a secondary winding 9. The primary winding is adapted to be connected with a source of alternating current by means of a two-wire cable 10, fitted with a connector plug 11. One end of the secondary winding is connected by a conductor 12 to one terminal of the rectifier 4, the other terminal of which is connected, in the form shown in Figures 1 and 2, by means of a conductor 13 to a terminal strip 14 secured to but insulated from one of the side walls of the casing 1. The opposite end of the secondary winding connects with one terminal of the lamp socket 6, through a conductor 15. The transformer and rectifier are small, selected only large enough to provide a charging rate for a single battery.

The rectifier 4 may be of any suitable type giving either half or full wave rectification. For example, it may be either a cold cathode vacuum tube, a hot cathode gaseous tube, a hot cathode vacuum tube, or any of the disc type rectifiers such as a copper sulfide, copper oxide or selenium rectifier. Because of the relatively short life, and consequent replacement problem presented by the bulb type rectifier, a copper oxide or selenium rectifier is preferred. It has been found that in copper oxide and selenium rectifiers an aging takes place in use which continues to a point after which there is not further appreciable aging. This aging results in a slight reduction in output but from the point where aging ceases, the rectifier continues to function with this slightly reduced output for many years to give practically an unlimited rectifier life.

The motor driven switch assembly 5 comprises a rotary switch 16 driven by a small motor 17, preferably of a type having a substantially constant speed, through a speed reducing gear train 18. The switch is not illustrated in detail in the drawings but is shown diagrammatically in Figure 2 and represented by its enclosing casing in Figure 1. It may be any suitable commercial rotary switch of the type having a stator deck or wafer carrying a plurality of contact points or segments 19 arranged thereon in a circle and adapted to be successively contacted by a brush 20 carried by a rotary shaft 21. The arrangement of the contacts and brush should be such that the brush does not bridge adjacent contacts in passing from one to another.

It is desirable to keep the size of the charging unit small and preferably, though not necessarily, the number of contact points or segments of the switch stator correspond to the maximum number of batteries in a group to be charged. For instance, if the charger is to be used in connection with a display rack or shelf for ten batteries, the switch stator may have ten contacts. Since, however, as will be more fully set forth, only one battery is connected into the charging circuit at a time, the number of contact points or segments may be increased beyond that of the number of batteries in a normal group and the unit made adaptable to handle an increased number of batteries.

Figure 2:
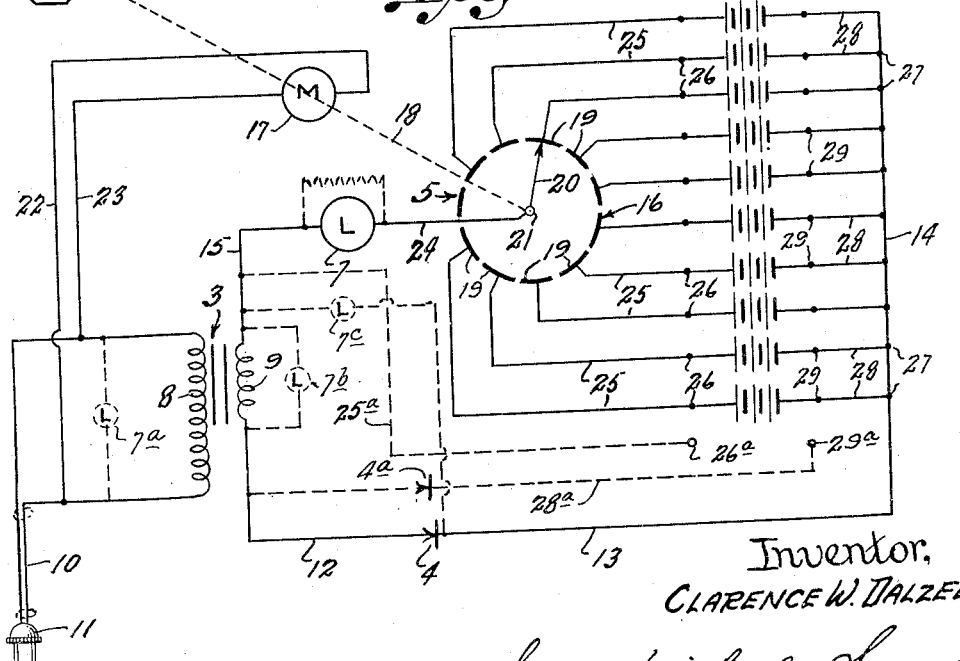
Figure 2 is a circuit diagram of the charger shown in Figure 1 showing the charging connection to a group of nine batteries.

The motor 17 may likewise be of conventional design, either an alternating or direct current operated electric motor or a manually or electrically wound spring motor. Motor 17, shown by way of example in the drawings is a small AC motor having its shaft coupled to the rotor shaft of the switch 16 through the gear train 18, the speed reduction ratio of which is selected to give the desired torque for operation of the switch and a predetermined number of cycles per day for each battery. The speed of operation of the switch and the number of charging cycles per day for each battery is of little importance since regardless of the speed of the switch, the ratio of the time on to time off of the charging current per day, for instance, will not be affected. Of course, the speed should be more or less uniform to give each battery of the group approximately the same charge per day. In addition, the speed of the switch should be low enough to avoid undue wear on the mechanism thereof. The motor may receive its current supply, as shown in Figure 2, by connections 22 and 23 to the two-wire, A. C. cable 10.

The second terminal of the light socket 6 is connected by means of a conductor 24 to the switch brush 20, while each of the switch segments 19 has respectively connected thereto one end of a flexible, acid-proof cable 25. Cables 25 pass through separate bushings in the case 1 and terminate in terminal lugs 26. These lugs are preferably sheet metal members having an extruded hole adapted to fit over the battery terminal post. Conductor strip 14, mentioned above, is provided with binding posts 27, corresponding in number to the number of cables 25. To each of the posts 27 is connected one end of a flexible, acid-proof cable 28, each of which terminates in a terminal lug 29 similar to the lug 26 but having a hole of a different size than that of the lug 26. The hole sizes of the lugs 26 and 29 correspond to the different post diameters of the battery to facilitate proper polarity of connections of the battery into the charging circuit.

It may sometime be desirable to utilize the charger to bring up a dead battery. In order to provide for this, the existing transformer 3 and a second rectifier 4a might be utilized. As shown by dotted lines in Figure 2, the rectifier 4a may be connected with one end of the secondary winding 9 and supplied with a flexible cable 78a terminating in a terminal lug 29a while a second cable 25a, which carries a terminal 26a on its free end, may be connected to the conductor 24. Thus, the secondary of the transformer 3 would be fed through the second rectifier 4a with an independent wire circuit to the terminal lugs 26a and 29a and a battery connected to these lugs would receive a continuous charge, independently of the intermittent charging circuit, until such time that it is brought up to sufficient charge to disconnect it from the continuous charging circuit and connect it into the intermittent charging circuit. Preferably the continuous charging circuit should deliver a somewhat higher current, for example 2 to 5 or more amperes. In some cases, where a greater charging output with a small rectifier may be desirable in the continuous charging circuit, the cable 25a may be connected to the line 15 thus eliminating the resistance of the lamp 7 from this circuit.

The lamp 7 serves several purposes. First, it provides an indication in the direct battery charging circuit to show the operator when there is current being passed through the battery in the proper direction. Secondly, it provides an indication when the battery is connected in the charging circuit in reverse because the lamp will become unusually bright or burn out depending upon the lamp used with the increased current prevailing in the lamp circuit. Thirdly, it provides short circuit protection in that it will indicate the short by burning more brightly or burn out and limit the current in the rectifier circuit should dangling leads to any one battery be shorted together. Fourthly, because it has a higher resistance when more current passes through it, it provides a ballast effect, stabilizing the charging circuit against variations in primary voltage and battery charging voltage. The lamp 7 may be conveniently viewed through a suitable lens or similar element 30 in the side wall of the casing 1 adjacent the lamp. By proper selection of lamp with respect to the magnitude of current passing through it with a reversed battery, the lamp may be caused to burn out after a few seconds and thereby provide, in effect, fuse protection for the transformer, rectifier and battery.

Under certain operating conditions it may be desirable to control the charging rate where a commercially available lamp will not provide the required charging rate, to use the lamp 6 across a fixed resistor, the combination of lamp and resistor being placed in series in the secondary circuit in the manner of the lamp 7, shown in Figure 2. Various arrangements of a pilot lamp may also be incorporated in the circuit such as the lamp 7a across the A. C. line, lamp 7b across the secondary of the transformer, or the lamp 7c across the output of the rectifier. Each of these pilot lamps would give a visual indication at all times whether the A. C. plug 11 had become lossened in the wall socket and thereby endanger the charging of the batteries.

The operation of the charger, it is believed, will be obvious from the foregoing. It might be brought out, however, that with one or more batteries connected in the charging circuit, as shown in Figure 2, and the plug 11 inserted in a wall outlet, current will be supplied to the transformer 3 and also to the switch motor 17, which, as stated, will move the brush 20 slowly across the contact segments 19. With the brush 20 in contact with a switch segment, the secondary circuit will be completed through the rectifier 4, the battery connected with this particular segment, lamp 7 and the secondary winding 9. This battery will receive a charge as long as the brush contacts the segment connected therewith. As the brush breaks contact with this segment and makes contact with the next, the first battery will be disconnected from the charging circuit and the second battery connected therein and so on successively to the remaining batteries for a complete cycle of the switch rotor, when the cycle will be repeated. It will be understood from the above, since only one battery is receiving a charge at a time, any number of batteries within the capacity of the unit, may be connected into the charging circuit, each battery receiving the same charge for a predetermined per cent of the switch cycle. It will also be understood that regardless of whether a single battery or the entire group of batteries is connected into the charging circuit, the charger will charge it at a predetermined rate, for example, 1½ amperes, and hold this charging rate.

Figure 4:
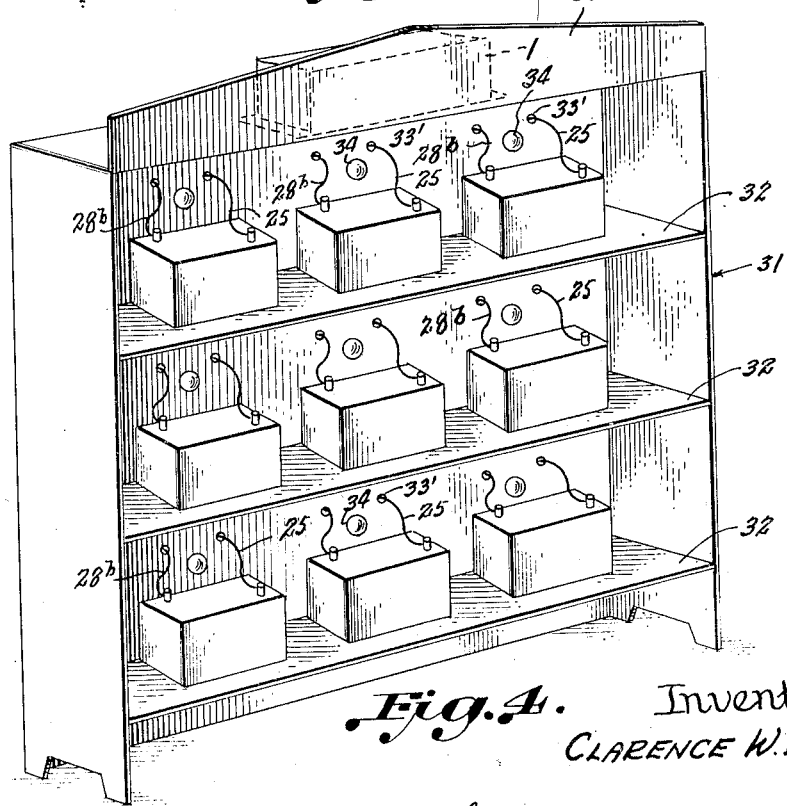
Figure 4 is a schematic view in perspective of a battery display rack which may be used in connection with the charging unit according to this invention.

The charger described above may be used in connection with a battery display rack such as illustrated in Figure 4. These display racks usually comprise an open front cabinet 31 provided with a number of shelves 32 upon which the batteries are placed for display and sale. The rack is also usually provided with a top panel 33 upon which may be placed suitable advertising. Preferably the charging unit is placed on top of the cabinet and hidden from view behind the panel 33 and when so placed, the lamp 7, if desired, may be utilized to illuminate by transmitted light, translucent advertising matter set into the panel 33. The charging cables 25 and 28 may be brought down behind the rack and passed through suitable insulating bushings 33' in the back wall of the rack above and adjacent the positions the batteries occupy on the shelves 32. Preferably the bushings 33' are made sufficiently large so that the cables will fit loosely therein and may be pushed rearwardly until the terminal lugs engage the bushings, thereby preventing shorting a charging circuit due to a pair of lugs contacting themselves or contacting the metal frame of the rack.

If the rack 31 is constructed of metal it may be utilized as one of the conductors in the charging circuit. Such an arrangement is shown diagrammatically in Fig. 3. Under such conditions, one end of the secondary winding 9 of the transformer may be grounded to the metal case 1 of the charger and the case have a metal to metal connection with the rack 31. The conductor strip 14 may be dispensed with and short cables or leads 28b may be used to connect one post of the batteries with the metal rack. The other cables or leads 25 for the opposite post of the batteries will be the same as described above, that is, pass through insulating bushings in the back wall of the rack and connect with the switch segment 19.

Figure 3:
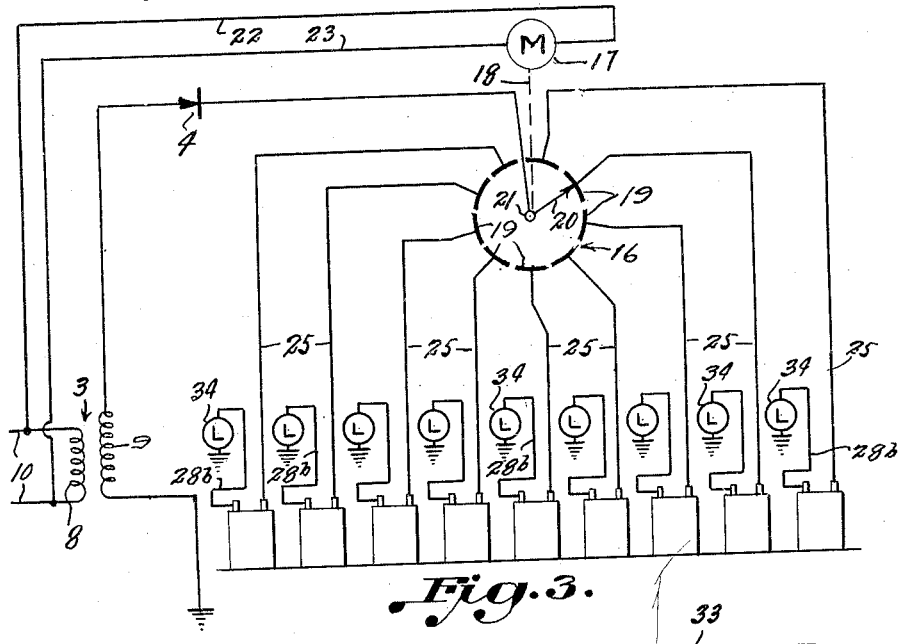
Figure 3 is a somewhat modified circuit diagram of the charger adapted for use with a metallic battery display rack.

It may be desirable to provide a pilot lamp adjacent each battery, both for attraction, resistance in the charging circuit, and at the same time, to indicate which battery is being charged. Such pilot lamps are indicated generally as 34. If the circuit shown in Figure 2 is employed in connection with the rack 31, the lamps 34 will be provided with two wire, insulated sockets connected in series in the lines 28. If the grounded circuit shown in Figure 3 is employed, however, the lamps 34 and their sockets may be of single wire, automotive type, the metal shell of the sockets being grounded to the rack in the manner indicated in Figure 3 and the leads 28b respectively connected to the center terminals of the lamp sockets. Such connection, it will be understood, will eliminate considerable wiring and thereby provide for a less expensive display unit.

In connection with the utilization of the charger assembly, such as using the lamp 7 to illuminate advertising matter, the motor 17 may likewise be utilized for other purposes, such as for the operation of animated signs, by means of suitable take-off mechanism (not shown) from the shaft of the motor or other suitable places in the gearing 18.

The foregoing description is given with references to maintaining fully charged a relatively small number of batteries, such as are usually found on the display shelves or racks of automotive accessory sales rooms or battery depots. It is to be understood however that the charger and the described system of intermittent charging are equally adaptable for keeping substantially large numbers of batteries, such as may be stored in battery warehouses, fully charged without departing from the spirit of the invention. In the latter case, since obviously there will be a much longer interval of time between periodic charging of the individual batteries, a higher charging rate, for example, 6 to 12 amperes, depending upon individual condition will be employed. It is to be further understood that while the transformer-rectifier type charger described will find the widest use, the invention is not to be considered restricted to this type charger as it is equally adaptable for intermittently charging batteries by means of other charging units such as a motor generator set or for controlling intermittently a charging current directly from a suitable source of direct current power.

Also, while for purposes of description, a motor driven rotary switch has been described, it will be realized that any type of switching device which will cyclically connect a group of batteries one at a time to the output of a charging device or source of charging current may be employed.

In describing the invention, it has been stated that a single battery is connected in each of the branch circuits completed by the switch, however, if warranted, more than one battery may be connected in series or parallel depending upon the number of cells in each battery and the results desired.

From the foregoing description, it will be appreciated that the invention provides a battery charger which will maintain a group of storage batteries at full charge, one which will keep the voltage low on the secondary side of the charging circuit and thereby permit low cost in transformer and rectifier, one which may be easily controlled and operated at highest efficiency, and one which has long life without replacement.

I claim:

1. In combination with a metallic rack for supporting a group of batteries, means including a circuit for supplying charging current to the batteries, multi-contact rotary switch means constructed and arranged in the circuit for connecting individually the batteries in said group successively in the circuit, and mechanism including motor means for operating the switch, said circuit having a common conductor to the batteries, and said rack constituting at least a part of said common conductor.

2. In combination with a metallic rack for supporting a group of batteries, a battery charger comprising a transformer having primary and secondary windings, a primary circuit for connecting the primary winding with a source of current, a rectifier, a secondary circuit including multi-contact rotary switch means for connecting individually the batteries of said group successively in series with the rectifiers and secondary winding, and mechanism including motor means for operating said rotary switch means, said secondary circuit having a common conductor to the batteries, and said rack constituting at least a part of said common conductor.

CLARENCE W. DALZELL.

REFERENCES CITED

The following references are of record in the file of this patent:

UNITED STATES PATENTS

| Number | Name | Date |
|---|---|---|
| 403,177 | Buell | May 14, 1889 |
| 585,620 | Cox | June 29, 1897 |
| 691,144 | Hutchison | Jan. 14, 1902 |
| 775,732 | Pape | Nov. 22, 1904 |
| 1,143,818 | Edison | June 22, 1915 |
| 1,362,794 | Hoff | Dec. 21, 1920 |
| 1,396,242 | Beach | Nov. 8, 1921 |
| 1,425,689 | Powell | Aug. 15, 1922 |
| 1,743,160 | Presser | Jan. 14, 1930 |
| 1,743,593 | Broadfoot | Jan. 14, 1930 |
| 1,993,914 | Bohn | Mar. 12, 1935 |
| 2,101,571 | Breisch | Dec. 7, 1937 |
| 2,173,736 | Thomas | Sept. 19, 1939 |
| 2,375,866 | Nelms et al. | May 15, 1945 |
| 2,390,771 | Blackburn | Dec. 11, 1945 |

FOREIGN PATENTS

| Number | Country | Date |
|---|---|---|
| 207,436 | Great Britain | Nov. 29, 1923 |
| 699,748 | France | Dec. 16, 1930 |